C. A. LINDBERG.
TROLLEY.
APPLICATION FILED AUG. 7, 1911.
1,039,975.
Patented Oct. 1, 1912.
3 SHEETS—SHEET 1.
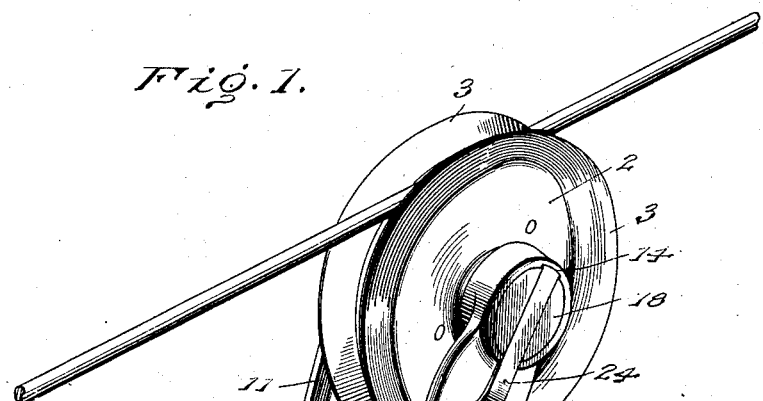
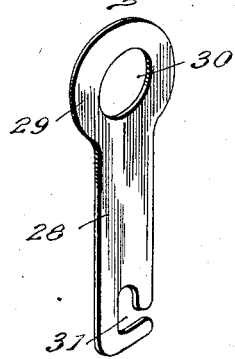
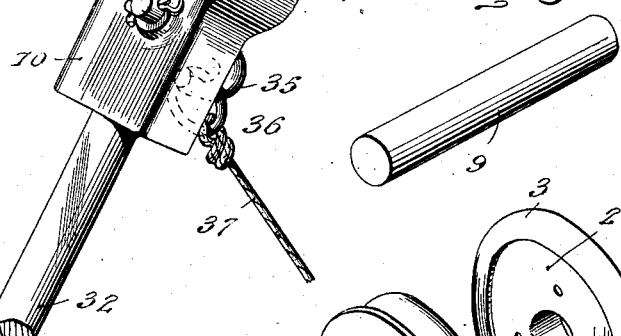
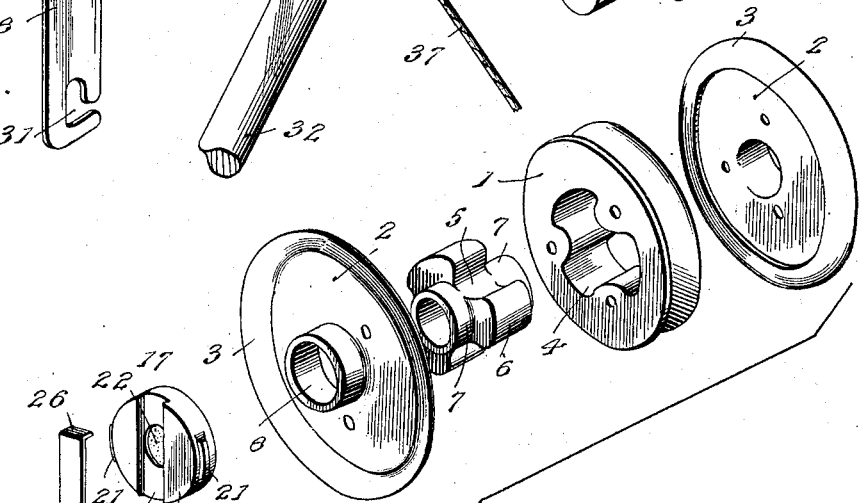
Inventor
Charles A. Lindberg
Witnesses

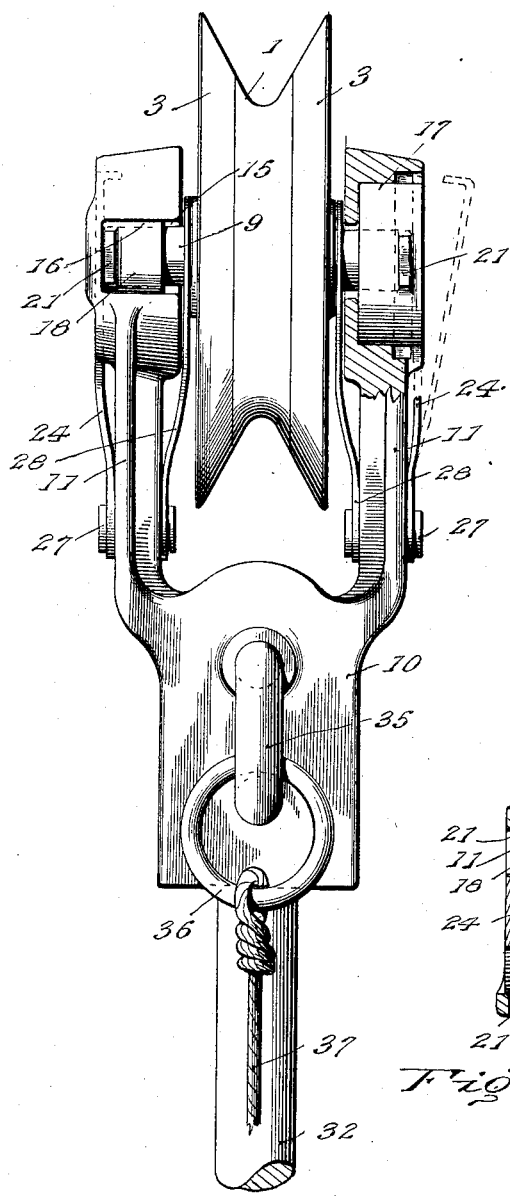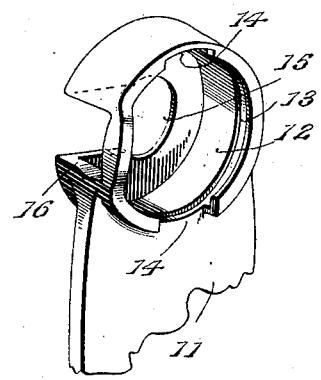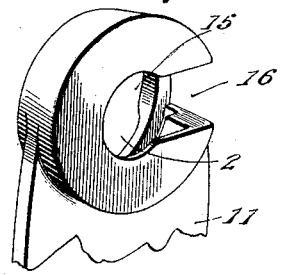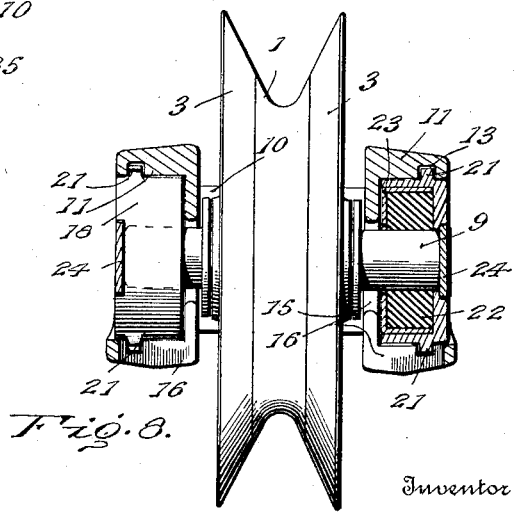

C. A. LINDBERG.
TROLLEY.
APPLICATION FILED AUG. 7, 1911.
1,039,975.
Patented Oct. 1, 1912.
3 SHEETS—SHEET 3.
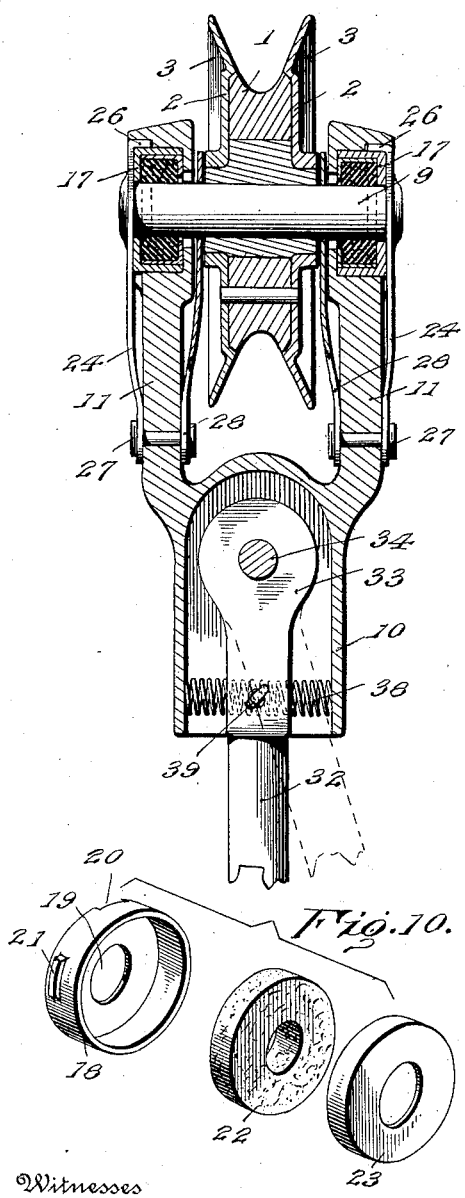
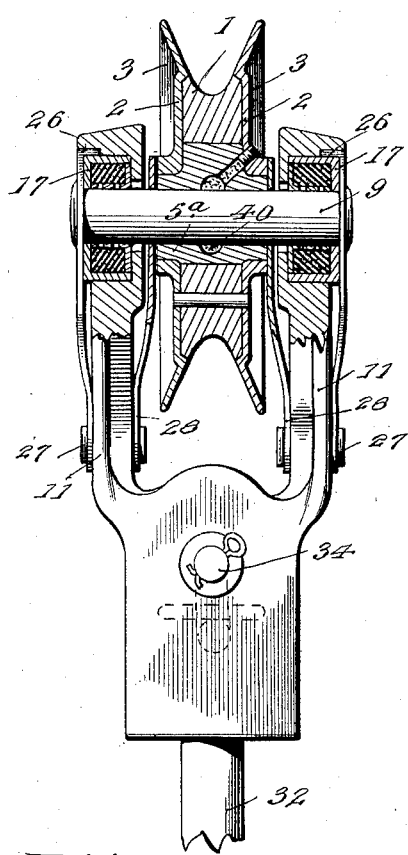
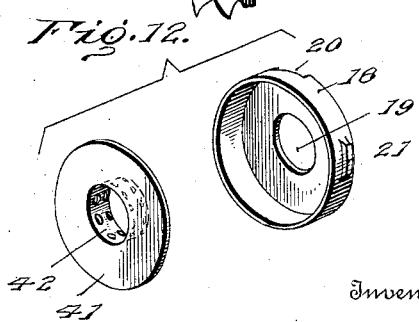
Witnesses
Inventor
Charles A. Lindberg.
By
Attorneys.

UNITED STATES PATENT OFFICE.

CHARLES A. LINDBERG, OF BRADFORD, PENNSYLVANIA.

TROLLEY.

1,039,975.  Specification of Letters Patent.  Patented Oct. 1, 1912.

Application filed August 7, 1911. Serial No. 642,638.

*To all whom it may concern:*

Be it known that I, CHARLES A. LINDBERG, citizen of the United States, residing at Bradford, in the county of McKean and State of Pennsylvania, have invented certain new and useful Improvements in Trolleys, of which the following is a specification.

This invention comprehends certain new and useful improvements in over-head trolleys, and relates particularly to an improved construction of trolley wheel, bearings therefor, trolley harp, contact members, and a novel connection between the trolley harp and pole.

One of the main objects of the invention is a simple, durable and efficient construction of trolley wheel, the parts of which are so formed and arranged that the middle section, which receives the greatest wear from its direct contact with the trolley wire, may be replaced when worn with a new section, without throwing away the entire wheel.

The invention also has for its object an improved construction of self-lubricating bearings for the wheel, by the use of which repeated applications of lubricant are rendered unnecessary, the longevity of the bearings being increased, and the running qualities and ease of operation being enhanced.

The invention has for a still further object an improved construction of trolley wheel and harp in which two pairs of double contacts are provided, thereby insuring an uninterrupted current, one set of contact members being preferably so constructed and arranged that they subserve a triple function, namely, they not only serve as contact members primarily, but also serve the additional function of locking devices for the bearings, and as tools whereby the bearings may be easily turned preparatory to their removal from their sockets in the forked members of the harp.

The invention also has for an object, an improved construction of harp and connection of the same with the pole, whereby the harp is permitted to have a limited lateral yielding movement, thereby avoiding the liability of the wheel jumping the wire. And the invention also aims to generally improve this class of devices and to render them more useful and commercially desirable.

For a full understanding of the invention, reference is to be had to the following description and accompanying drawings, in which:

Figure 1 is a perspective view of my improved trolley head; Fig. 2 is a detail perspective view of one of the contact members; Fig. 3 is a similar view of the shaft or spindle of one embodiment of the invention; Fig. 4 illustrates in detail some of the parts of the wheel and one of the contact members, said parts and contact member being shown detached from each other and in juxtaposition; Fig. 5 is a face view of the trolley head, partly in section; Figs. 6 and 7 are fragmentary perspective views of one of the fork arms of the trolley harp, illustrating particularly the journal sockets for the bearing; Fig. 8 is a horizontal section through the bearing sockets of the harp, one of the bearings being shown in section and the other in elevation; Fig. 9 is a vertical transverse sectional view of the head; Fig. 10 illustrates in detail one form of self-lubricating bearing; Fig. 11 is a sectional side elevation illustrating a modification hereinafter specifically referred to; and, Fig. 12 is a perspective view of two parts of the bearing illustrated as employed in said modification.

Corresponding and like parts are referred to in the following description and indicated in all the views of the drawings by the same reference characters.

The trolley wheel of my invention preferably embodies a main middle section 1 grooved in the conventional manner to engage the trolley wire, and two side sections or plates 2 which are preferably formed of pressed steel, these parts being riveted together, as clearly indicated in the drawings, with the section 1 interposed between the side plates or sections 2. The latter are formed with the conventional obliquely-disposed annular flanges 3, serving to retain the wheel in engagement with the wire. The middle section 1 is formed with an opening 4 of irregular outline extending therethrough, and in this opening there is fitted a hub section 5 of corresponding outline, the hub section, owing to the shape of the opening 4 and the corresponding formation of the protuberances 6 of the hub section, interlocking with the section 1 when placed in the opening 4, as will be clearly indicated by reference to Fig. 4. The hub section 5 is formed at its ends with tubular bosses 7 which fit within corresponding outwardly projecting bosses 8 formed centrally on the side sections or plates 2 of the wheel. A spindle or shaft 9 fits within the hub section 7 and manifestly also within the bosses 8 of the side plates 2, the spindle being secured to the wheel proper rigidly by any desired means. At this point it will be noted that the section 1 which receives almost all of the wear in the service of the wheel, may be detached from the hub section 5 and the side plates 2 and replaced by a new middle section, economies being thereby effected, as the entire wheel need not be thrown away when the grooved middle section thereof has become worn.

10 designates the harp. This is formed with laterally spaced arms 11 which in the present instance extend parallel to each other, as best illustrated in Fig. 5, each of said arms being formed at its free extremity with a bearing socket 12 opening outwardly therefrom in a lateral direction, said socket being formed at its outer side with a circumferentially or horizontally extending groove 13 which is intersected at diametrically opposite points by outwardly opening recesses 14 that are arranged in the present instance in substantially vertical alinement with each other, that is, in alinement with the longitudinal line of the harp and pole. Furthermore, each socket 12 opens at its inner side in a centrally disposed slot 15, and the latter leads outwardly from the rear side of the socket to a recess 16 formed in the rear wall of the arm.

The spindle 9 is entered into corresponding sockets 12 of the arms 11 through the recesses 16, and is held in place at its ends in the slots 15, by means of self-lubricating bearings, each of which is designated as a whole by the numeral 17, one of said bearings being illustrated in detail in Fig. 10. In the present embodiment of the invention now being described, each bearing comprises a bushing or spool 18 formed with an opening 19 to receive the adjacent end of the spindle 9, with a diametrically disposed groove 20 in its inner face intersecting the opening 19 and with diametrically disposed peripheral segmental lugs 21 set in rightangular relation to the groove. The inner face of the bushing 18 is open, as best illustrated in Fig. 10, to receive a disk 22 of graphite, carbon or other lubricating substance, and preferably preparatory to inserting the lubricating disk 22 into the bushing 18, said disk is mounted within a shell 23 of relatively light metal. It is, of course, to be understood that the disk 22 and shell 23 are formed with central registering openings corresponding to the opening 19 in location, the opening in the shell 23 being preferably somewhat larger than the opening in the disk 22, which latter opening is intended to snugly fit upon the shaft 9 so as to produce a direct self-lubricating bearing therefor. By providing the shells 23, the inner or opposing faces of the bearings are protected and by forming the opening in the shell 23 somewhat larger than the opening in the lubricating disk 22, provision is made for the wear of the lubricant.

It has been hereinbefore stated that the spindle 9 is entered into the slots 15 through the recesses 16, and it will, of course, be understood that the ends of the spindle project outwardly from the recesses 16 into the sockets, the spindle being retained in the sockets, as also before mentioned, by means of the bearings 17. The manner in which this is accomplished will now be described. In applying the parts, after the spindle has been inserted in place, the bearings 17 are entered in the sockets 12 from the outer sides thereof, the lugs 21 registering first with the recesses 14, and the bearings being then turned, whereby said lugs will ride in the grooves 13 and be locked in place, the final secured position of the bearings being that in which the grooves 20 thereof extend longitudinally of the harp with the ends of the grooves registering with the recesses 14. The bearings are securely held in this position by means of outer spring contact members 24, one of which is illustrated in detail in Fig. 4. Each of these outer spring contact members is composed of any suitable metal, and each is formed at one end with a fork 25 and at its opposite end with an inturned hook or lug 26. The fork 25 is designed to detachably engage and embrace the shank of a pin 27 secured in and extending transversely of the arm 11 to the outer face of which the contact member is applied, the contact member being then turned upon the shank of the pin 27 as an axis until the main body portion of the contact member registers with the groove 20 and the recesses 14, the contact member being then released so as to snap into the groove and recesses, the hook 26 of the contact member entering the uppermost recess, as is evident, and thereby tending to securely lock the contact member in place as well as to hold the bearing from turning out of its locked position.

With the parts assembled, the contact members 24 engage the ends of the spindle 9, as will be best illustrated by reference to Fig. 8, and thereby conduct the current from the wheel through the spindle to the harp and thence down through the pole to the motor of the car. It is to be particularly noted that not only do these contact members 24 serve to conduct the current and lock the bearings in place as against a rotary movement which would tend to permit them to fall out, but that they also may serve as tools to turn the bearings when it is desired to remove the same, or to turn them into locked position, the main or body portions of the contact members being applied to the grooves 20 to perform this operation. By the provision of the disks 22 repeated applications of lubricant are rendered unnecessary, the parts being thereby rendered self-lubricating which is a desideratum in this class of devices.

In addition to the outer contact members 24, I employ inner contact members 28, one of which is illustrated in detail in Fig. 2. There are two of these inner contact members, as best illustrated in Fig. 5. Each of these is composed of a strip of sheet metal with a substantially circular head 29 formed with an opening 30 by which it is inserted snugly upon the spindle 9 so as to contact therewith, the opposite end of the contact member 28 being formed with a bayonet slot 31, as shown. In assembling the parts, the contact members 28 are slipped upon the spindle 9 before the latter is inserted through the recesses 16 into the slots 15, and it is to be particularly noted that the recesses 15 are of a size sufficient to permit a limited longitudinal movement of the spindle, whereby the slotted ends of the contact members may be first entered into the entrance portions of the bayonet slots 31, and then, when the bushings 18 are applied to the spindle and the latter centered in the sockets 12, the said ends of the contact members 28 will be forced in a longitudinal direction so that the pins 27 with which they engage enter the bottoms of the slots 31 so as to securely lock the contact members 28 in place.

It will thus be seen that I have provided a self-lubricating trolley wheel and contact members therefor, the parts of which are so constructed and arranged that the wheel and contact members may be easily applied to the harp and as readily disengaged therefrom.

In addition to the features hereinbefore specified, my invention also comprises, as indicated at the outset of the specification, an improved construction of harp and connection of the same with the trolley pole. In the present embodiment of the device, the pole, designated 32, is formed with an apertured upper end 33 in which a connecting pin 34 is mounted, said pin extending through the front and rear faces of the base of the harp 10 and being held in place by a cotter pin or the like, as shown. The rear end of the pin 34 is formed with a hook 35 designed for engagement by a ring 36 to which the ordinary rope or cable 37 is connected. From this it will be understood, particularly in connection with Figs. 1 and 5, that the recesses 16 of the forked arms 11 of the hook are disposed downwardly and rearwardly in the operative position of the pole, harp and wheel, whereby the parts will be protected as far as possible from the action of the elements. By the provision of this pin connection between the pole 32 and harp 10, and the chamber which is provided in the lower or base end of the harp for the pole to work in, it is evident that a limited lateral movement is permitted the harp relative to the pole, this tending to reduce the liability of the wheel jumping the wire. In order to make this movement a yielding one and to return the harp to its normal position into alinement with the pole, the upper end of the pole is formed with an opening extending transversely therethrough and a coiled compression spring 38 is secured in said opening by a pin 39 or similar fastening devices, the ends of said spring protruding out from opposite sides of said opening and bearing against the side walls of the chamber 10 that is formed in the lower end of the harp. This is clearly illustrated in Fig. 9.

From the foregoing description in connection with the accompanying drawings, the operation of my improved trolley wheel and harp and the connection of the latter with the pole will be readily apparent, as will also the manner of assembling and disassembling the parts, as such operations have been described in connection with the details of construction and relative arrangements of the parts.

It is to be understood that my invention is not limited to the exact construction, arrangement and proportions of the parts hereinbefore described and illustrated in Figs. 1 to 10 of the accompanying drawings, as various changes may be made without departing from the scope of the invention as defined in the appended claims. For instance, as best illustrated in Figs. 11 and 12, the hub section of the wheel, said section being designated 5ª in Fig. 11, may be provided with a chamber 40 for lubricant and with a duct leading into said chamber, as shown, whereby my improved sectional wheel is rendered adaptable for use in connection with the ordinary spindles and harps. Or again, instead of using the graphite or carbon lubricating disk 22, I may employ in lieu thereof a filler disk 41, illustrated in detail in Fig. 12, adapted to fit within the bushing 18 to close the inner space thereof, said filler disk being formed at its center with an annular flange 42 perforated as shown, whereby lubricant mounted in the bushing, may be fed to the spindle 9.

Various other changes will suggest themselves to those versed in the art to which this invention appertains and without departing from the principles of the invention.

Having thus described the invention, what is claimed as new is:

1. A wheel support comprising arms formed with bearing sockets having grooves, the arms having recesses communicating with said sockets, a wheel supporting spindle insertible through said recesses into said sockets, and bearings insertible into the sockets and formed with peripheral lugs adapted to enter the grooves, whereby to lock the bearings in the sockets.

2. A wheel support formed with bearing sockets, a wheel supporting spindle insertible in said sockets, the outermost walls of said sockets being formed with grooves and with diametrically disposed recesses opening into the grooves, bearings insertible in said sockets to engage the ends of the spindle and formed with peripheral lugs adapted to pass through the recesses and into said grooves, whereby to lock the bearings in the sockets, and members connected to the support and adapted to extend across the ends of the spindle and the bearings and to fit in said recesses to hold the spindle and bearings in place.

3. A wheel support embodying arms formed with bearing sockets, a wheel supporting spindle insertible in said sockets, the walls of said sockets being formed with grooves and with diametrically disposed recesses intersecting said grooves, bearings also insertible in said sockets to engage the spindle and formed on their outer faces with lugs, and members secured at one end to said arms, arranged to enter the recesses in the bearings.

4. A wheel support embodying arms provided with bearing sockets, a wheel supporting spindle insertible in said sockets, the walls of said sockets being formed with grooves and with diametrically disposed recesses intersecting said grooves, bearings also insertible in said sockets to engage the spindle and formed with lugs, and members secured to one end of the arms and being formed with lugs adapted to enter the sockets in the arms.

In testimony whereof, I affix my signature in presence of two witnesses.

CHARLES A. LINDBERG. [L. S.]

Witnesses:
W. N. WOODSON,
FREDERICK S. STITT.

---

Copies of this patent may be obtained for five cents each, by addressing the "Commissioner of Patents, Washington, D. C."